United States Patent [19]

Hewitt

[11] Patent Number: 5,148,933

[45] Date of Patent: Sep. 22, 1992

[54] ACCESS MOTOR COVER FOR A SAWING TABLE

[76] Inventor: Timothy Hewitt, P.O. Box 839, Royal Oak, Mich. 48068

[21] Appl. No.: 674,126

[22] Filed: Mar. 25, 1991

[51] Int. Cl.$^5$ ............................................. B65D 43/02
[52] U.S. Cl. .................................. 220/4.31; 220/677; 83/477.2
[58] Field of Search ...................... 83/859, 860, 477.2, 83/162, 478; 51/271; 409/134; 74/608; 29/DIG. 50, DIG. 86, DIG. 94; 403/353, 375, 380; 220/4.31, 677; 217/62, 63; 160/104, 90; 49/463, 465

[56] References Cited

U.S. PATENT DOCUMENTS

| | | | |
|---|---|---|---|
| 1,340,248 | 5/1920 | Petit | 220/4.31 |
| 2,492,824 | 12/1949 | Ahrndt et al. | 83/860 |
| 3,194,619 | 7/1965 | Dannenberg | 217/62 |
| 3,297,345 | 1/1967 | Downing, Jr. | 403/375 |
| 4,605,335 | 8/1986 | Otrusina | 403/353 |

FOREIGN PATENT DOCUMENTS 0549371 12/1958 Italy ................................. 220/677

Primary Examiner—Frank T. Yost
Assistant Examiner—Allan M. Schrock
Attorney, Agent, or Firm—Gifford, Groh, Sprinkle, Patmore and Anderson

[57] ABSTRACT

A cover for permitting quick access to the housing motor of a sawing table includes an inner face and an outer face. The inner face is further provided with a top edge which extends inwardly at an angle from the inner face. The top edge of the cover is further provided with downwardly-directed pin members. The pins members engage pin apertures formed in the top surface of a motor housing so as to securably engage the cover onto the housing structure in a downward fashion. A downwardly-directing ledge formed on a lower position of the inner face engages a lip of a bottom surface of the motor housing simultaneous with the engagement of the pin and pin apertures. The cover is thus securely attached onto the motor housing of the saw table. The cover is quickly and easily removed by upward force applied to a tongue disposed on the outer face of the cover.

5 Claims, 1 Drawing Sheet

ACCESS MOTOR COVER FOR A SAWING TABLE

BACKGROUND OF THE INVENTION

I. Field of the Invention

The present invention relates to machine covers, and more particularly to a cover for permitting quick access to the motor housing of a sawing table.

II. Description of the Prior Art

Conventional saw support tables including motors for driving a saw blade are known in the art. In some situations the motor is housed externally of the support table as is shown in U.S. Pat. No. 4,640,326 issued to Hewitt, U.S. Pat. No. 4,367,665 issued to Terpstra et al. and U.S. Pat. No. 2,711,762 issued to Gaskell. In other embodiments the motor is housed partially inside of the table with the remainder protruding outwardly. Reference is made to U.S. Pat. No. 2,666,461 issued to Johnson. Finally, an example of a motor disposed entirely within the table support is shown in U.S. Pat. No. 2,810,408 issued to Boice et al.

A recurring problem with saw tables which employ internally positioned motors is that they tend to draw saw dust and shavings within the sawing table by virtue of a vacuum generated by the motor. Also, access to the motor is occasionally required for other maintenance purposes. U.S. Pat. No. 3,866,502 issued to Brewer, Sr. discloses an adjustable sliding plate that allows the operator access to the saw table arbor and related blade. However the plate is provided on the top of the saw table and is directed at providing an access specifically to the blade and related elements only.

What is required is a cover for a motor rotary housing of a saw table which permits quick access to the rotary motor in order to perform quick maintenance chores or to remove fouling particles which accumulate therein

SUMMARY OF THE PRESENT INVENTION

The present invention provides a cover for permitting quick access to the motor housing of a saw table which overcomes the above-mentioned disadvantages of the prior art devices.

In brief, the cover of the present invention comprises an inner face and an outer face. The inner face of the cover is further provided at an upper end with an inwardly-directed and angled top edge which engages a top surface of the motor housing. The top edge is provided with at least one downwardly-directed pin member which engages a pin aperture formed in the top surface of the housing. The pins and pin apertures permit the cover to be vertically placed upon the housing.

A downwardly-directed ledge is further positioned at a lower end on the inner face of the cover. The ledge defines a gap between the cover inner face and the ledge. The gap receives a bottom lip extending upwards from the bottom surface of the motor housing concurrent with the engagement of the pin and pin apertures at the top surface. The dual engagement means disclosed securely positions the access cover onto the motor housing without the need for screws or the like. An outwardly-flared tongue is further provided along a bottom of the exterior surface of the cover and provides a grip for facilitating the vertical lifting and removal of the cover from the housing when access to the interior of the motor housing is desired. cl BRIEF DESCRIPTION OF THE DRAWING A better understanding of the present invention will be had upon reference to the following detailed description, wherein like reference characters refer to like parts throughout the several views, and in which:

DETAILED DESCRIPTION OF A PREFERRED EMBODIMENT OF THE PRESENT INVENTION

Figure 1:
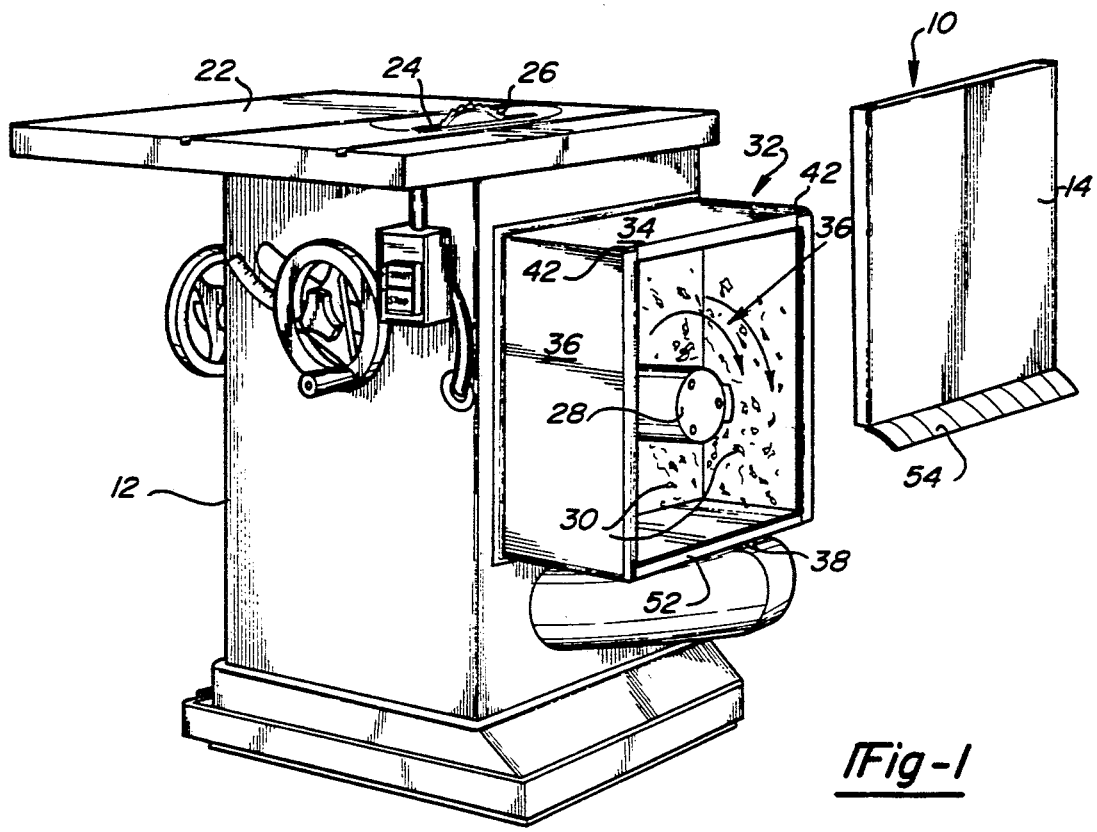
FIG. 1 is a perspective view of a preferred embodiment of the present invention.
Figure 2:
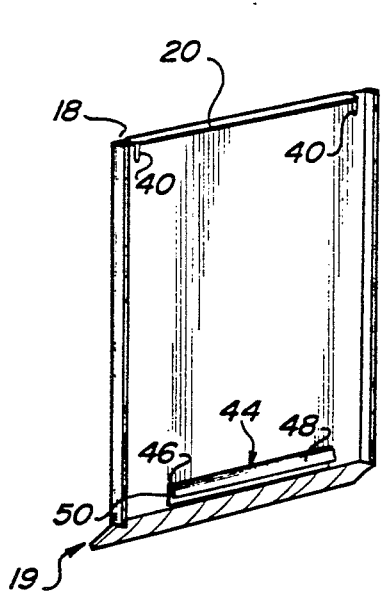
FIG. 2 is an inner view of the cover of the present invention.
Figure 3:
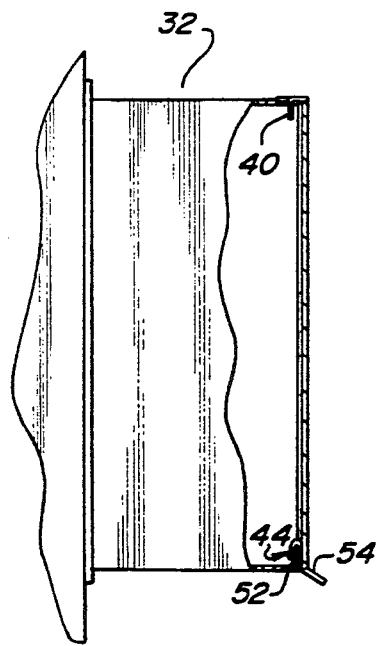
FIG. 3 is a side view showing the cover of the present invention in an attached position.

With reference to FIGS. 1 and 2, a preferred embodiment of the cover 10 for a sawing table 12 of the present invention is thereshown and comprises an outer face 14 and an inner face 16. The cover 10 is preferably of a square construction and displays four sides of equal length. The cover terminates at upper and lower ends 18 and 19. The cover is further provided at the upper end 18 with a top edge 20 which extends inwardly toward the table 12 at an angle with respect to the inner face 16 of the cover 10.

The saw table 12 provides a table surface 22 with a table recess 24 for allowing a saw blade 26 to be positioned therethrough. A saw motor 28 is positioned internally of the saw table 12 and powers the saw blade 26. When the blade 26 is in operation, a vacuum generated by the motor tends to draw shavings 30 and other particles produced by the saw blade 26 through the recess 24 and towards the region of the motor 28. A motor housing 32 surrounds the motor 28 and collects the shavings. The housing 32 typically comprises a top surface 34, side surfaces 36, and a bottom surface 38 formed in a shape consistent with the outline of the motor cover 10.

Referring again to FIG. 1 the top edge 20 of the cover 10 is further provided with a pair of downwardly-directed pin members 40. When installing the cover 10 onto the housing 32 the pin members 40 engage a pair of pin apertures 42 located through the top surface of the motor housing 32. The pins 40 and pin apertures 42 are located such that they engage in a vertical fashion allowing the housing cover 10 to be secured in an aligned manner with the housing 32.

A ledge 44 is also provided on the inner face of the cover at the lower end 19. The base 46 of the ledge 44 extends in a horizontal direction across the inner face. A ledge wall 48 extends downwardly parallel to the inner face 16 to form a gap 50 therebetween. The ledge 44 and the inner face 16 engage a lip 52 extending upwards from the bottom surface 38 of the motor housing 32. As a result, the cover 10 is securely fastened to the motor housing at both the upper and lower ends 18 and 19. An outwardly flared tongue 54 is further provided along the bottom of the cover exterior surface and provides a handle for vertically lifting and removing the cover 10 from the housing 32.

In operation, when saw shavings accumulate within the motor housing, the cover may be removed by grasping the outwardly flared tongue with one hand and any of the other cover edges with the other hand. Upward force applied to the cover causes the pins to disengage from the pin apertures at the upper end and the ledge from the bottom surface lip at the lower end. In this manner, the cover can be quickly and efficiently removed from the motor housing without the necessity of screwdrivers or other tools to remove screws which normally secure covers of similar units.

Having described my invention, many modifications thereto will become apparent to those skilled in the art to which it pertains without deviation from the spirit of the invention as defined by the scope of the appended claims.

I claim:

1. A cover for permitting quick access to a motor housing of a sawing table, said cover comprising:

an outer face and an inner face, a top edge and a bottom edge;

said top edge extending inwardly at an angle with respect to said inner face, said top edge of said cover engaging a top surface of said motor housing to limit the downward displacement of said cover;

at least one pin extending downwardly from said top edge of said cover toward said bottom edge so that said at least one pin overlies and is substantially parallel to the plane of said inner face, said at least one pin receivable into a pin aperture provided through said top surface of said motor housing to align and secure said top edge of said cover to said housing when said top surface of said housing is engaged by said top edge; and means for simultaneously securing said bottom edge of said cover to a bottom surface of said motor housing as said at least one pin is positioned through said pin aperture.

2. The cover as described in claim 1, wherein said means for securing said cover to a bottom surface of said housing further comprises a downwardly-directed ledge positioned on said inner face adjacent to said bottom edge of said cover, said ledge engageable with a lip provided at said bottom surface of said motor housing concurrent with engagement of said at least one pin with said pin aperture provided through said top surface.

3. The cover as described in claim 2 wherein said at least one pin is two pins.

4. The cover of claim 2 further comprising means for facilitating vertical lifting and removal of said cover from said motor housing.

5. The cover as described in claim 4, wherein said means for facilitating comprises an outwardly-flared tongue on said cover along a bottom edge of said exterior surface.

* * * * *

UNITED STATES PATENT AND TRADEMARK OFFICE
CERTIFICATE OF CORRECTION

PATENT NO. : 5,148,933
DATED : September 22, 1992
INVENTOR(S) : Timothy Hewitt

It is certified that error appears in the above-indentified patent and that said Letters Patent is hereby corrected as shown below:

Column 1, line 33, delete "motor rotary" and insert --rotary motor--.

line 65, delete "cl BRIEF DESCRIP-".

line 66, delete "TION" and insert --BRIEF DESCRIPTION--.

Signed and Sealed this

Fifth Day of July, 1994

Attest:

BRUCE LEHMAN

Attesting Officer

Commissioner of Patents and Trademarks